Patented Oct. 31, 1933

1,932,457

UNITED STATES PATENT OFFICE 1,932,457

DIGESTER

James L. Green, Lakewood, Ohio, assignor to National Carbon Company, Inc., a corporation of New York No Drawing. Application June 18, 1932
Serial No. 618,089

6 Claims. (Cl. 92—19)

This invention relates to improvements in digesters, and has particular reference to a new protective lining material for digester shells, of the type employed by the pulp and paper industry in the manufacture of chemical pulp.

The most common materials heretofore used for the lining of pulp digesters have been those of a ceramic nature, including various combinations of brick, tile, cement, and other silicious products. These linings, due to the variation in quality of ceramic bricks, or for other reasons, are subject to serious defects. Under the rapid temperature changes encountered in the digester, especially when a cold charge is introduced into the hot digester, cracking and spalling of the lining occurs. This spalling not only causes the introduction of impurities into the pulp, but also readily destroys the lining and greatly shortens its service life.

In accordance with my invention I have found that carbon can be fabricated into a protective lining for the shells of pulp digesters which is far superior to the ordinary ceramic lining. In its ability to protect the shell from corrosion carbon has all the advantages of ceramic material, and at the same time is substantially free from the defects encountered with prior linings. Carbon bricks are more uniform in character than the ordinary ceramic bricks, they are not subject to spalling under sudden temperature changes, and therefore provide a lining of much longer life than those made of the materials heretofore used for this purpose.

The durability of a carbon lining may be attributed to the many advantageous chemical and physical characteristics of carbon. Carbon is chemically inert to both acids and alkali, and is therefore capable of withstanding the action of cooking liquor, at the temperature and pressure employed in chemical pulp digesters, and it may be used equally well as a lining in both the alkali and acid pulp treating processes. Furthermore, the low coefficient of expansion of carbon, combined with its high heat conducting capacity as compared with ceramic material, imparts to the carbon brick lining a great resistance to thermal shock. For this reason the carbon lining does not spall under rapid temperature changes in the digester, as, for instance, when a hot charge is blown out and a cold charge is introduced, conditions which cause the most severe spalling of the ordinary ceramic lining.

Carbon can be fabricated into most any desired shape, and is therefore readily available in the form of bricks or blocks suitable for incorporating into a liner. In its original application as a lining material the carbon was used in the form of bricks of substantially the same size and shape as the ordinary ceramic brick. It has also been found desirable, at least for certain purpose, to make up the lining in a series of blocks, including a variety of shapes, all adapted to fit certain portions of the digester, and thereby provide a lining which conforms very closely to the inner contour of the shell, including the dome-shaped top and coned bottom. As a bonding medium between the carbon blocks, a cement of litharge and glycerine has been found to be very satisfactory, both in the alkali and acid processes. The bonding cement may, however, be appropriately modified, if necessary, to suit any particular pulp treating process, and among other cements which might be used are bituminous cement, Portland cement, or a cement of carbonaceous material.

In applying the carbon lining to the metal shell, the procedure heretofore commonly used may be followed. It has been customary, when using ceramic material, to build up a lining having an over all thickness which may vary between 3½" and 7½". Between the interior facing of the lining and the metal shell, a backing is usually provided consisting of a concrete grouting composed of about equal parts of Portland cement and quartz sand. This backing is suitable for use with my carbon lining, but all brick construction is preferably of carbon, so that the entire inner facing of the digester which is in contact with the cooking liquor presents a surface composed throughout of carbon. Under certain circumstances it may be advantageous to line only a portion of the digester with carbon, those portions, for instance, which are most susceptible to chemical corrosion and wear by spalling. Then again an entire carbon brick facing might be applied directly over an old ceramic lining where it would not appear economical to remove the old lining. In any event the particular manner of applying the carbon lining forms no part of my present invention.

The lining bricks or blocks may be formed in the manner usually employed in the molding of carbon articles. While a coke base carbon, preferably mixed with a certain amount of coal, has been found to be especially suitable, the carbon base may be modified as desired, since any type of carbon will show the chemical and physical characteristics so desirable for the purpose of my invention.

It will be evident that various modifications in the preferred embodiments, herein disclosed, may be made without departing from the spirit of my invention, and the invention should not be limited other than as defined in the appended claims.

I claim:—

1. A digester for cooking fibrous materials with chemical liquors, lined throughout with carbon bricks.

2. A digester for cooking fibrous materials with chemical liquors, lined throughout with carbon bricks, said bricks having lower thermal expansion than ceramics.

3. A digester for use in cooking fibrous material with chemical liquors, provided with a backing lined with carbon bricks.

4. A digester for cooking fibrous material with chemical liquors having a lining of carbon.

5. A digester for cooking fibrous materials with chemical liquors, lined with carbon containing coke as the base material.

6. A digester for use in the acid and alkali process for digesting fibrous material, lined throughout with carbon brick bonded together with a cement of litharge and glycerine.

JAMES L. GREEN.